(12) United States Patent
Eliasson

(10) Patent No.: US 9,289,900 B2
(45) Date of Patent: Mar. 22, 2016

(54) CALIBRATION TOOL FOR A DELTA ROBOT

(75) Inventor: Gustav Eliasson, Vasteras (SE)

(73) Assignee: ABB Technology Ltd, Zurich (CH)

( * ) Notice: Subject to any disclaimer, the term of this patent is extended or adjusted under 35 U.S.C. 154(b) by 0 days.

(21) Appl. No.: 14/423,022

(22) PCT Filed: Aug. 24, 2012

(86) PCT No.: PCT/EP2012/066512
§ 371 (c)(1),
(2), (4) Date: Feb. 20, 2015

(87) PCT Pub. No.: WO2014/029448
PCT Pub. Date: Feb. 27, 2014

(65) Prior Publication Data
US 2015/0217454 A1 Aug. 6, 2015

(51) Int. Cl.
*B25J 9/00* (2006.01)
*B25J 9/16* (2006.01)

(52) U.S. Cl.
CPC .............. *B25J 9/1692* (2013.01); *B25J 9/0051* (2013.01)

(58) Field of Classification Search
CPC .... B25J 9/1692; B25J 9/1697; B25J 17/0266; B25J 9/0051; B25J 9/0078; G01B 11/005; G01B 5/0004; G01B 5/008; G01B 21/045; G01B 21/047
USPC ............................ 33/613, 645, 503, 651, 661
See application file for complete search history.

(56) References Cited

U.S. PATENT DOCUMENTS

| | | | |
|---|---|---|---|
| 5,333,514 A * | 8/1994 | Toyama et al. | 74/490.06 |
| 6,516,681 B1 * | 2/2003 | Pierrot et al. | 74/490.01 |
| 6,587,802 B1 * | 7/2003 | Schroder et al. | 702/91 |
| 6,662,461 B2 * | 12/2003 | McMurtry | 33/558.2 |
| 7,356,937 B2 * | 4/2008 | Nishibashi et al. | 33/502 |
| 7,386,408 B2 * | 6/2008 | Nishibashi et al. | 702/94 |
| 7,520,156 B2 * | 4/2009 | Matsushita | 73/1.79 |
| 8,113,083 B2 * | 2/2012 | Breu | 74/490.01 |
| 8,225,692 B2 * | 7/2012 | Kock et al. | 74/490.03 |
| 8,272,290 B2 * | 9/2012 | Zhang et al. | 74/490.01 |
| 2009/0133276 A1 * | 5/2009 | Bailey | 33/503 |
| 2009/0260243 A1 * | 10/2009 | Evans et al. | 33/502 |
| 2010/0005919 A1 * | 1/2010 | Breu | 74/490.05 |
| 2011/0132131 A1 * | 6/2011 | Worz | 74/490.05 |
| 2012/0317826 A1 * | 12/2012 | Jonas | 33/503 |
| 2014/0277715 A1 * | 9/2014 | Nagai et al. | 700/248 |
| 2015/0158180 A1 * | 6/2015 | Trompeter | B25J 9/1692 |

(Continued)

FOREIGN PATENT DOCUMENTS

EP 2359988 A1 8/2011
JP 2007075956 A 3/2007

(Continued)

OTHER PUBLICATIONS

Deblaise, et al.; "Effective Geometrical Calibration of a Delta Parallel Robot Used in Neurosurgery"; Intelligent Surgical Instrument & Systems; Aug. 2005; pp. 815-820.
International Search Report and Written Opinion of the International Searching Authority Application No. PCT/EP2012/066512 Completed: May 22, 2013; Mailing Date: Jun. 6, 2013 11 pages.

(Continued)

*Primary Examiner* — Yaritza Guadalupe-McCall
(74) *Attorney, Agent, or Firm* — Whitmyer IP Group LLC

(57) ABSTRACT

A jig for calibrating a Delta robot fixes the longitudinal axes of drive arms to be parallel. With this configuration, the jig always fixes the drive arms at the same reference angle no matter what the drive arm length is.

13 Claims, 1 Drawing Sheet

(56) References Cited

U.S. PATENT DOCUMENTS

2015/0176956 A1* 6/2015 Pettersson et al. ..... G01B 5/008
2015/0217454 A1* 8/2015 Eliasson ................ B25J 9/1692
   33/655
2015/0285616 A1* 10/2015 Jordil ................... G01B 21/047
   33/503
2015/0300798 A1* 10/2015 Pettersson ............. G01B 5/008
   33/503

FOREIGN PATENT DOCUMENTS

JP   2009255197 A   11/2009
JP   4809390 B2     11/2011

OTHER PUBLICATIONS

Vischer, et al.; "Kinematic Calibration of the Parallel Delta Robot"; Robotica (1998) vol. 16, pp. 207-218.

* cited by examiner

CALIBRATION TOOL FOR A DELTA ROBOT

FIELD OF THE INVENTION

The present invention relates to a device for calibrating a robot comprising at least three parallel drive arms.

BACKGROUND OF THE INVENTION

Referring to FIG. 1, a Delta robot 10 comprises a plurality of parallel drive arms 20 connected to an end effector 30 by means of rods 40. The rods 40 constitute together with the drive arms 20 and the end effector 30 parallelograms which restrict the movement of the end effector 30 to pure translation. Each drive arm 20 is driven by a servo motor through a gearbox, and the movement is transmitted to the rods 40 and ultimately to the end effector 30 via kinematic chains comprising ball joints 50 between the drive arms 20 and the rods 40, and the rods 40 and the end effector 30, respectively. A traditional Delta robot 10 has three drive arms 20 and three degrees of freedom, but variants of a Delta robot 10 may have four or more drive arms 20, and also more than three degrees of freedom. In the Delta robot 10 according to FIG. 1 a fourth degree of freedom is provided by a central shaft 60 transmitting rotating movement to the end effector 30.

When calibrating a drive arm 20 of a Delta robot 10, the respective drive arm 20 needs to be moved to a known position that is used as a reference position for the calibration. A conventional way of fixing a drive arm 20 into a reference position is to push the drive arm 20 all the way up until it comes into contact with a calibration pin 70 positioned at a robot base 80. While this reference position is accurate enough for many applications, for other applications it is not. The position of the calibration pin 70 in relation to the drive arm 20 depends on a chain of tolerances between the two components, and consequently the reference position is not as accurate as desired.

JP2009255197 discloses a jig that is configured to fix the drive arms of a Delta robot into a reference position. The jig is attached between a robot base and an end effector, and the reference position is transmitted to the drive arms via rods.

In practice a certain type of Delta robot has several configurations with different drive arm lengths and rod lengths (all the drive arms in a certain configuration having, of course, the same length, and all the rods in a certain configuration likewise having the same length). A drawback with the jig according to JP2009255197 is that when the drive arm length or the rod length changes, a use of the same jig results in a different reference angle value. There is therefore a desire to improve the existing methods of fixing a drive arm of a Delta robot into a reference position.

SUMMARY OF THE INVENTION

One object of the invention is to provide a Delta robot calibration tool that provides an improved accuracy for a reference position, and that always results in the same reference position despite the length of the drive arms.

A further object of the invention is to provide an improved method for calibrating a Delta robot.

These objects are achieved by the device and method for calibrating a robot.

The invention is based on the realization that there is only one drive arm position where the relative positions of two distal drive arm ends remain unchanged when the drive arm length is changed, this drive arm position being the one where the longitudinal axes of the two drive arms are parallel i.e. the angular position of each drive arm is +90°.

According to a first aspect of the invention, there is provided a jig for calibrating a robot comprising at least three parallel drive arms. The jig is configured to fix the longitudinal axes of at least two drive arms to be parallel. With this configuration, the jig always fixes the drive arms at the same reference angle no matter what the drive arm length is.

According to one embodiment of the invention, the jig is configured to fix the longitudinal axes of at least three drive arms to be parallel. The reference position becomes more precise when at least three drive arms are attached to the jig.

According to one embodiment of the invention, the jig comprises an attachment element configured to interact directly with a drive arm. The reference position becomes more precise when the jig is attached directly to the drive arms.

According to one embodiment of the invention, the attachment element is a jig socket configured to interact with a ball. The balls belonging to ball joints at the drive arms are found to be suitable attachment elements for the jig.

BRIEF DESCRIPTION OF THE DRAWINGS

The invention will be explained in greater detail with reference to the accompanying drawings, wherein.

DETAILED DESCRIPTION OF THE INVENTION

Figure 1:
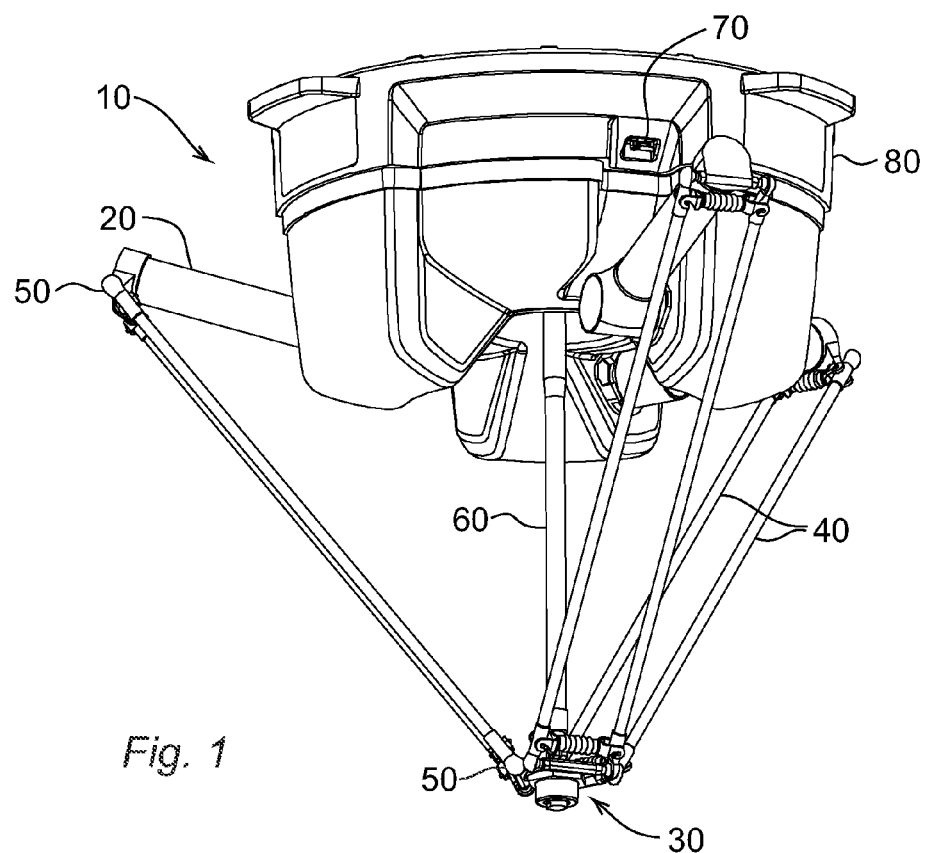
FIG. 1 shows a conventional Delta robot.
Figure 2:
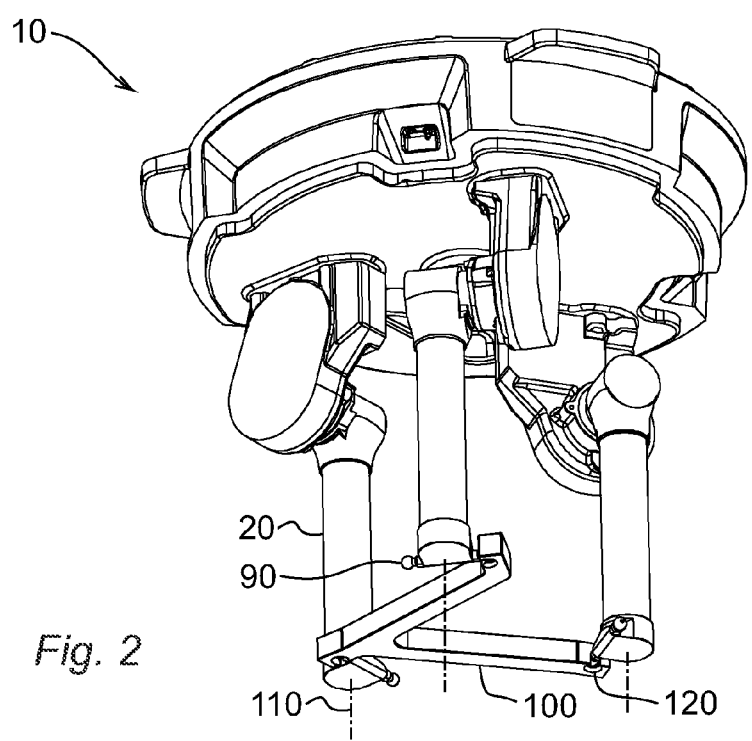
FIG. 2 shows a jig according to one embodiment of the invention attached to a Delta robot.

A Delta robot 10 shown in FIG. 2 corresponds to that of FIG. 1 with some components, among other things the rods 40 and the end effector 30, removed. Each of the three drive arms 20 comprises two studs with a ball 90, the balls 90 being configured to constitute ball joints 50 together with rod sockets at the ends of the rods 40. According to one embodiment of the invention, one ball 90 at each drive arm 20 is instead attached to a jig 100 that fixes the drive arms 20 into a reference position during calibration. More precisely, the jig 100 fixes the drive arms 20 into a position where the longitudinal axes 110 of all the drive arms 20 are parallel i.e. a position where the angular position of each drive arm 20 is +90°. In this reference position the relative positions of the balls 90 remain unchanged when the drive arm length is changed, and consequently usage of the jig 100 results in an identical reference angle value for robot configurations with different drive arm lengths. The jig 100 comprises jig sockets 120 interacting with the balls 90 for the attachment.

In theory, it is sufficient to attach the jig 100 to only two of the drive arms 20 to fix the longitudinal axes 110 of the two drive arms 20 to be parallel. Because of clearings between the balls 90 and the jig sockets 120, and at the bearings of the drive arms 20, respectively, the reference position becomes much more precise when all the three drive arms 20 are attached to the jig 100. In the case of a Delta robot 10 with more than three drive arms 20 it is advantageous to attach all the drive arms 20 to a corresponding jig 100 during calibration.

The invention is not limited to the embodiments shown above, but the person skilled in the art may modify them in a plurality of ways within the scope of the invention as defined by the claims.

The invention claimed is:
1. A jig for calibrating a robot comprising at least three drive arms, characterized in that the jig is configured to fix respective longitudinal axes of at least two of the at least three drive arms to be parallel relative to one another.

2. The jig according to claim 1, wherein the jig is configured to fix respective longitudinal axes of the at least three drive arms to be parallel relative to one another.

3. The jig according to claim 1, wherein the jig comprises an attachment element configured to interact directly with a drive arm.

4. The jig according to claim 3, wherein the attachment element is a jig socket configured to interact with a ball.

5. A Delta robot comprising at least three drive arms and a jig according to claim 1 attached to the Delta robot.

6. A method for calibrating a robot comprising at least three drive arms, the method comprising the steps of:
   fixing respective longitudinal axes of at least two of the at least three drive arms to be parallel relative to one another; and
   using corresponding positions of the at least two drive arms as reference positions for the calibration.

7. The method according to claim 6, wherein the method further comprises the step of fixing respective longitudinal axes of the at least three drive arms to be parallel relative to one another.

8. The method according to claim 6, wherein a jig is attached directly to the at least two drive arms during the fixing step.

9. A delta robot, comprising:
   a first drive arm extending along a first longitudinal axis;
   a second drive arm extending along a second longitudinal axis;
   a third drive arm extending along a third longitudinal axis; and
   a jig connected to the first and second drive arms, and configured to positionally fix the first and second drive arms such that first and second longitudinal axes are parallel relative to one another.

10. The delta robot according to claim 9, wherein the jig is removably connected to respective distal ends of the first and second drive arms.

11. The delta robot according to claim 9, wherein the jig is connected to the first, second, and third drive arms, and is configured to positionally fix the first, second and third drive arms such that the first, second, and third second longitudinal axes are parallel relative to one another.

12. The delta robot according to claim 11, wherein the jig is removably connected to respective distal ends of the first, second, and third drive arms.

13. The delta robot according to claim 12, wherein the respective distal ends of the first, second, and third drive arms are configured to be removably connected to an end effector when the jig is removed from connection with the respective distal ends of the first, second, and third drive arms.

* * * * *